(12) United States Patent  (10) Patent No.: US 8,796,587 B2
Kachline  (45) Date of Patent: Aug. 5, 2014

(54) WELDING GUN

(71) Applicant: Lincoln Global, Inc., City of Industry, CA (US)

(72) Inventor: Jeff Kachline, Highland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/800,152

(22) Filed: Mar. 13, 2013

(65) Prior Publication Data

US 2013/0264324 A1  Oct. 10, 2013

Related U.S. Application Data

(62) Division of application No. 11/623,521, filed on Jan. 16, 2007, now Pat. No. 8,426,774.

(60) Provisional application No. 60/759,057, filed on Jan. 17, 2006.

(51) Int. Cl.
*B23K 9/16* (2006.01)

(52) U.S. Cl.
USPC .................................................. 219/137.42

(58) Field of Classification Search
USPC .............. 219/74, 137.31, 137.61, 121.5
See application file for complete search history.

(56) References Cited

U.S. PATENT DOCUMENTS

| | | | |
|---|---|---|---|
| 452,863 A | 5/1891 | Fisher | |
| 4,529,863 A * | 7/1985 | Lebel | 219/137.42 |
| 5,911,894 A | 6/1999 | Colling | |
| 6,689,987 B2 | 2/2004 | Altekruse et al. | |
| 6,744,013 B2 | 6/2004 | Jones | |
| 6,852,950 B2 | 2/2005 | Giese | |
| 7,663,074 B2 | 2/2010 | Wells | |
| 2004/0026394 A1 | 2/2004 | Giese | |

* cited by examiner

*Primary Examiner* — Brian Jennison
(74) *Attorney, Agent, or Firm* — Perkins Coie LLP

(57) ABSTRACT

A welding gun, including a contact tip assembly, a diffuser cap, a tip holder, and a shielding gas diffuser, where the shielding gas diffuser includes a casing and an axial tube extending within the casing, and where the casing and the tip holder are connected via a connection system that includes threads with reduced peaks.

36 Claims, 21 Drawing Sheets

SECTION A-A

SECTION A-A

SECTION A-A

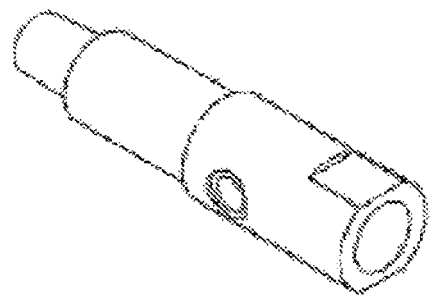
FIG. 35
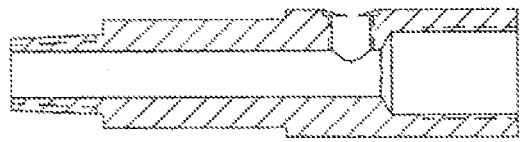
SECTION A-A
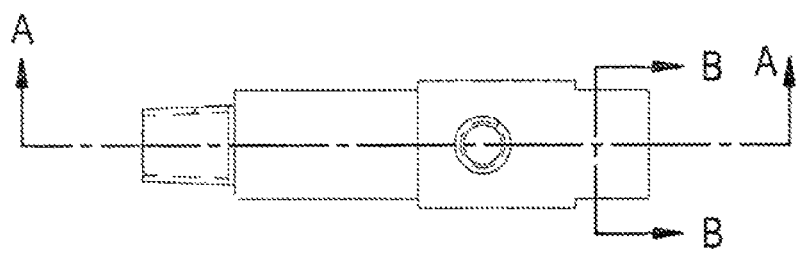 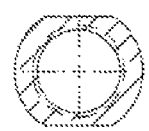
FIG. 36 SECTION B-B

WELDING GUN

CROSS-REFERENCE TO RELATED APPLICATION

This application is a Divisional claiming priority to U.S. Ser. No. 11/623,521 filed Jan. 16, 2007 which is based upon and claims the benefit of priority from U.S. Provisional Application 60/759,057 filed on Jan. 17, 2006 in the United States Patent and Trademark Office, the disclosures of which are incorporated herein by reference in their entirety.

BACKGROUND OF THE INVENTION

1. Field of the Invention

Devices, systems, and methods consistent with the invention relate to a shielding gas diffuser, and a welding gun.

2. Description of the Related Art

A welding gun is utilized to perform electric arc welding. In the related art, a welding gun includes a welding torch at its front end, and an elongated flexible conduit at its rear end. An elongated flexible conduit directs welding wire and shielding gas from a wire feeder to the welding torch. The welding torch includes a contact tip, a diffuser, a nozzle, and a gooseneck.

In use, the welding wire is directed through the gooseneck, diffuser, and contact tip to be welded on a work-piece. Shielding gas is directed through the gooseneck and is immediately diffused by orifices in the diffuser into a chamber defined by the nozzle around the contact tip, so that the shielding gas forms a protective layer between the molten metal of the welding operation and the surrounding atmosphere.

However, this arrangement is deficient in several respects. First, during welding operations, spatter is created, especially during short circuit conditions. This spatter can cause substantial deterioration of the contact tip and diffuser over time. Second, tremendous arc temperatures are created during welding operations, and are thermally transferred through the arc tip into the diffuser and gooseneck. These high temperatures also can cause substantial deterioration and/or deformation of the tip, diffuser, and gooseneck, and can even cause the tip to fuse to the diffuser in some cases. Such fusing destroys the diffuser, which is a relatively expensive component of the welding gun.

The above problems demand an improvement in the related art system.

BRIEF SUMMARY OF THE INVENTION

In one aspect of the invention, there is provided a welding gun that overcomes the problems of the related art.

In another aspect of the invention, there is provided a shielding gas diffuser, including a casing and an axial tube extending within the casing.

In another aspect of the invention, there is provided a shielding gas diffuser, including a casing and axial tubes extending within the casing.

In another aspect of the invention, there is provided a shielding gas diffuser, including a casing and a connection system for a tip holder on a radially inner surface of the casing.

In another aspect of the invention, there is provided a shielding gas diffuser, including a casing and a means for transporting shielding gas axially within the casing.

In another aspect of the invention, there is provided a shielding gas diffuser, including a casing and a means for connecting a tip holder on a radially inner surface of the casing.

In another aspect of the invention, there is provided a welding gun including a shielding gas diffuser, the shielding gas diffuser including a casing and an axial tube extending within the casing.

In another aspect of the invention, there is provided a welding gun including a shielding gas diffuser, the shielding gas diffuser including a casing and a connection system for a tip holder on a radially inner surface of the casing.

The above stated aspects, as well as other aspects, features and advantages of the invention will become clear to those skilled in the art upon review of the following description.

BRIEF DESCRIPTION OF THE DRAWINGS

The above and/or other aspects of the invention will be more apparent by describing in detail exemplary embodiments of the invention with reference to the accompanying drawings, in which:

FIG. 35 illustrates an isometric view of a gun connector of the exemplary embodiment of the welding gun of the invention;

FIG. 36 illustrates top and sectional views of the gun connector of the exemplary embodiment of the welding gun of the invention;

DETAILED DESCRIPTION OF EXEMPLARY EMBODIMENTS

Figure 1:
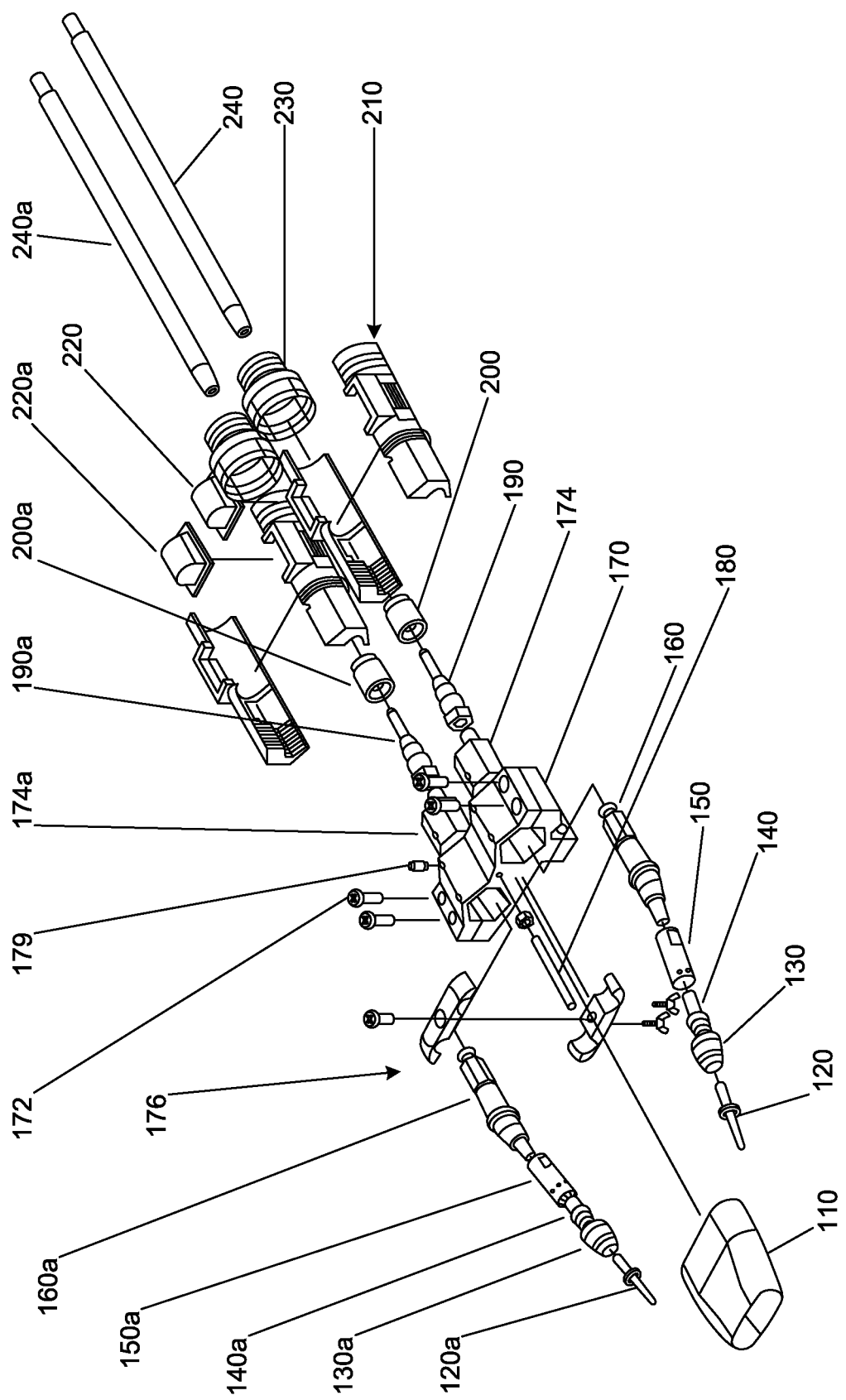
FIG. 1 illustrates an exploded view of a welding gun according to an exemplary embodiment of the invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

An exemplary embodiment of the invention is shown in FIG. 1. In this exemplary embodiment, welding gun 100 is an air-cooled, tandem (i.e., having two contact tips), welding gun. But, the invention described herein is broadly applicable to many other types of welding guns, such as water-cooled welding guns, and welding guns with any number of contact tips, including only a single contact tip.

In the exemplary embodiment of FIG. 1, welding gun 100 includes nozzle 110, contact tip assembly 120 (120a), diffuser cap 130 (130a), which is also known as a "spatter guard," tip holder 140 (140a), diffuser 150 (150a), gooseneck 160 (160a), handle clamp 170, cable connector block 174 (174a), gooseneck clamp 178, rod 180, power cable male cone 190 (190a), power cable female nut 200 (200a), handle 210 (210a), handle cap 220 (220a), handle end cap 230 (230a) and conduit 240 (240a).

Figure 2:
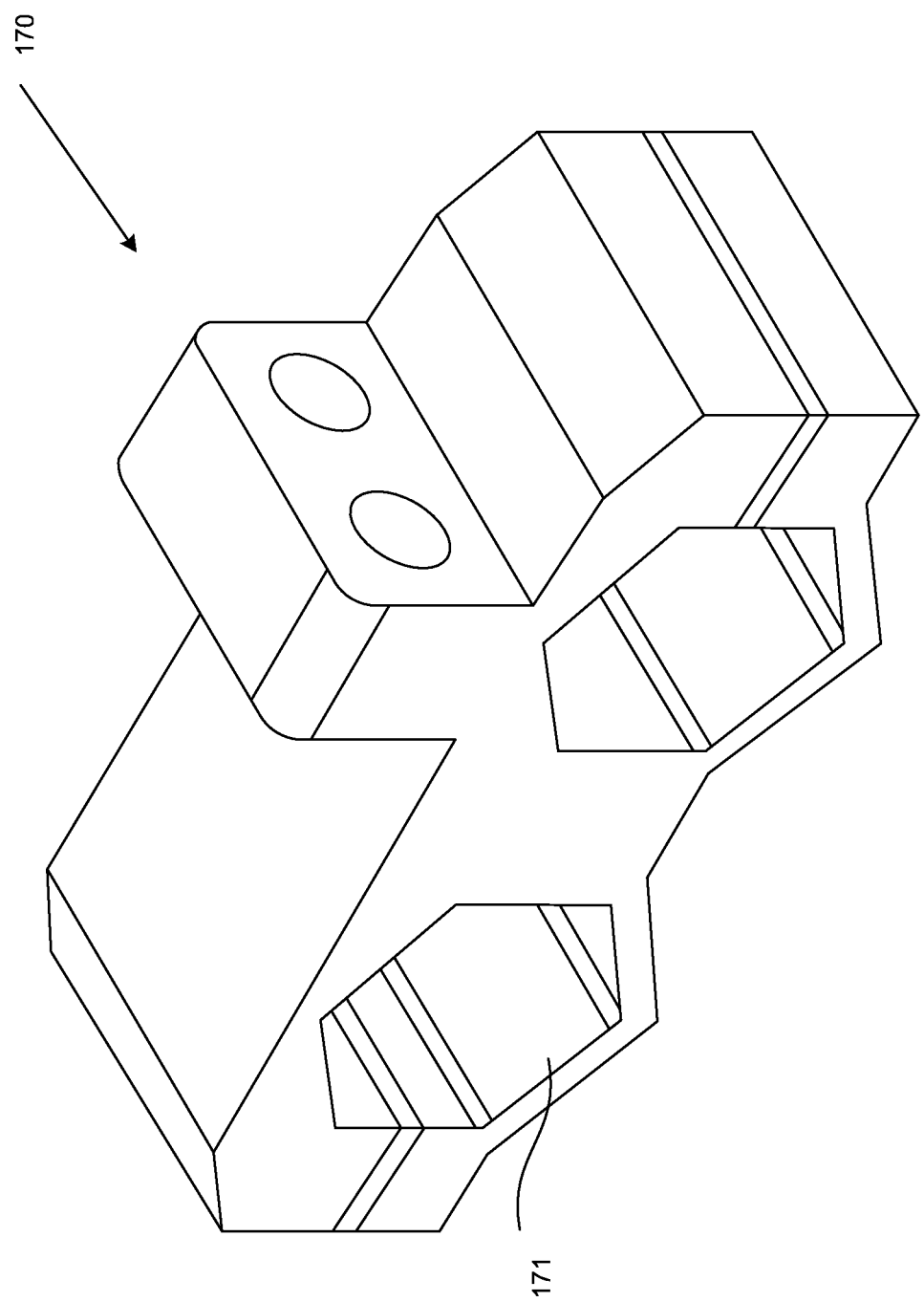
FIG. 2 illustrates an isometric view of a handle clamp of the exemplary embodiment of the welding gun of the invention.
Figure 3:
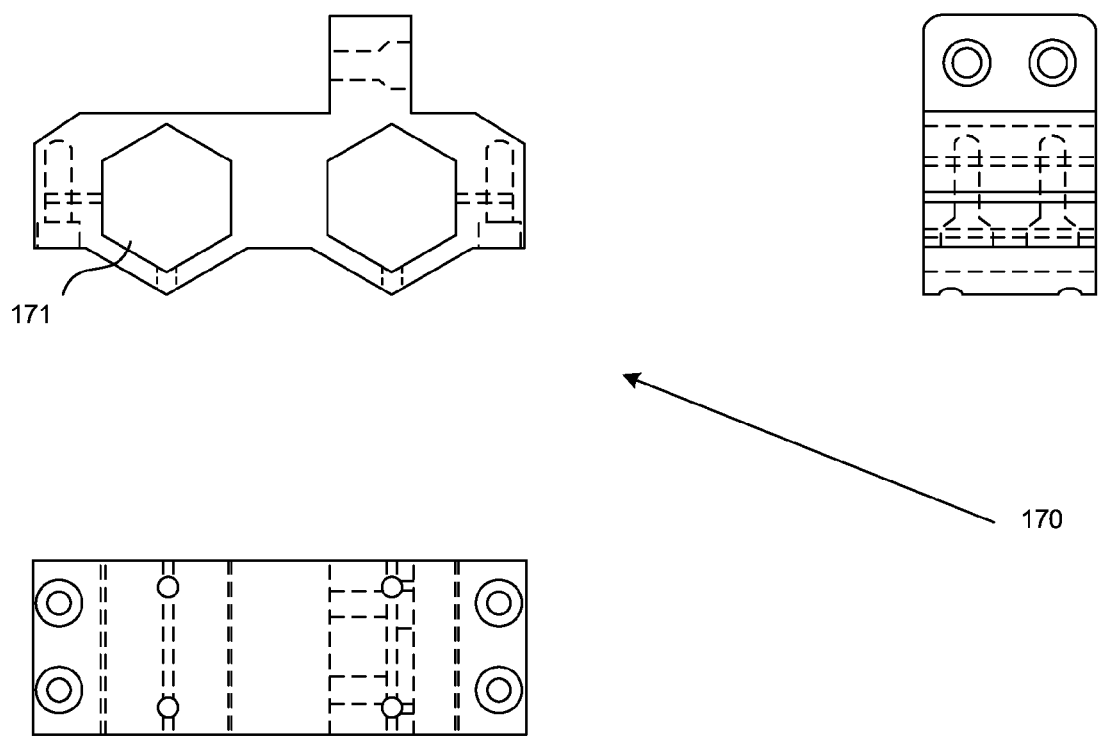
FIG. 3 illustrates front, side, top and bottom views of the handle clamp of the exemplary embodiment of the welding gun of the invention.
Figure 4:
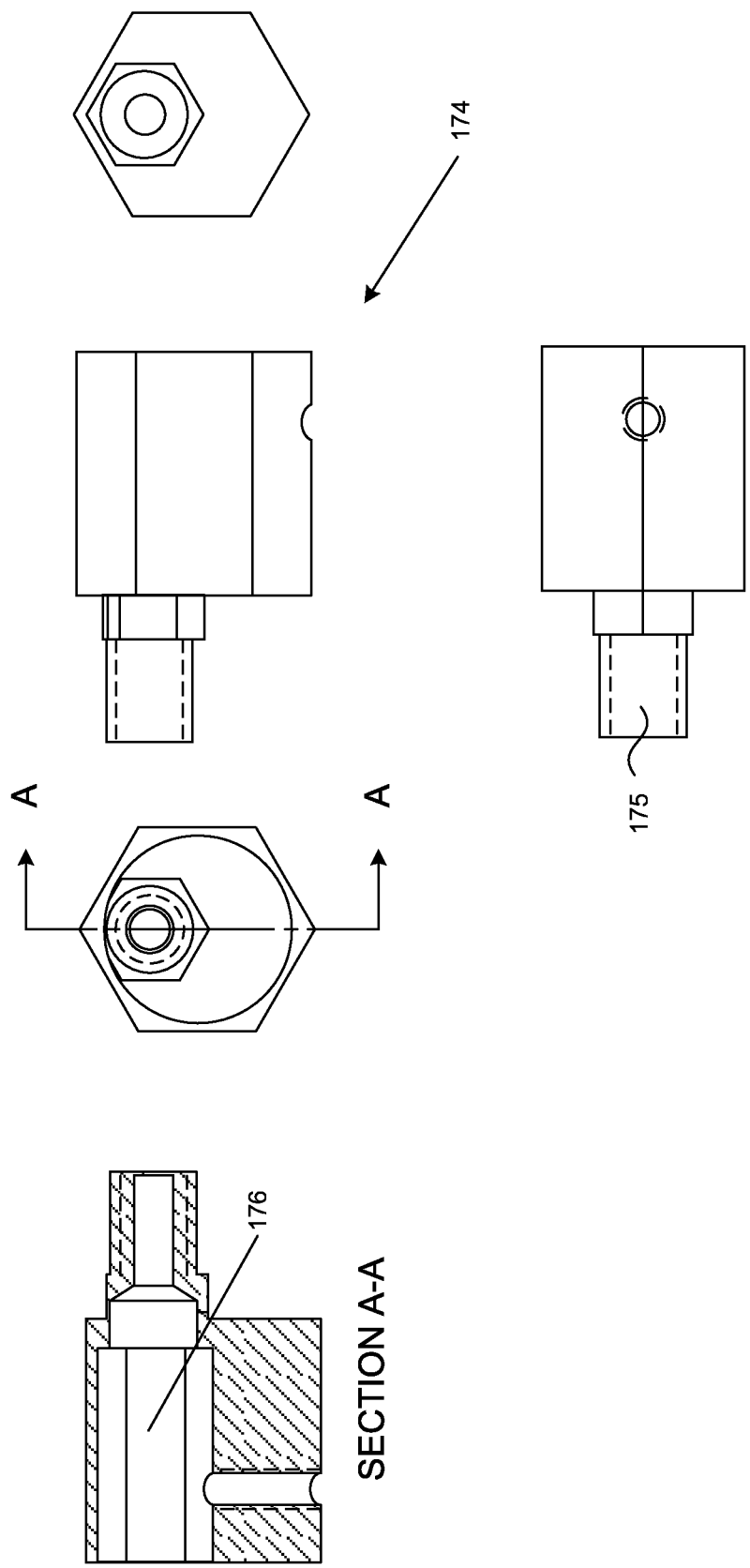
FIG. 4 illustrates front, side, rear, and sectional views of a cable connector block of the exemplary embodiment of the welding gun of the invention.
Figure 5:
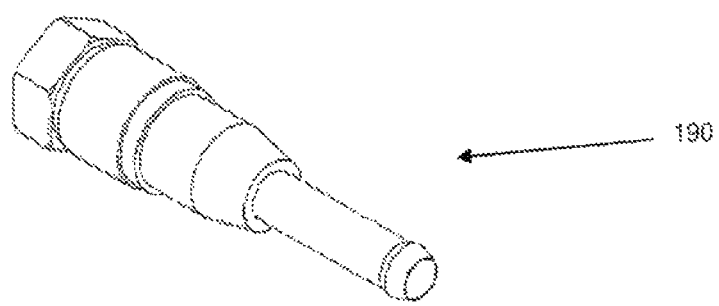
FIG. 5 illustrates an isometric view of a power cable male cone of the exemplary embodiment of the welding gun of the invention.
Figure 6:
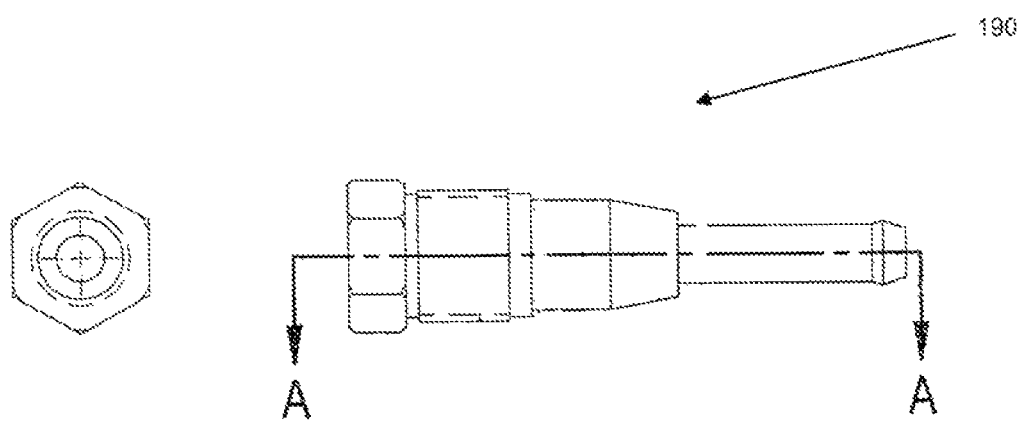
FIG. 6 illustrates front, top, and sectional views of the power cable male cone of the exemplary embodiment of the welding gun of the invention.
Figure 7:
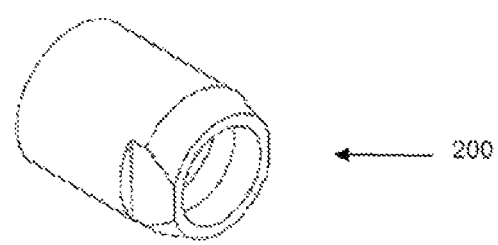
FIG. 7 illustrates an isometric view of a power cable female nut of the exemplary embodiment of the welding gun of the invention.
Figure 8:
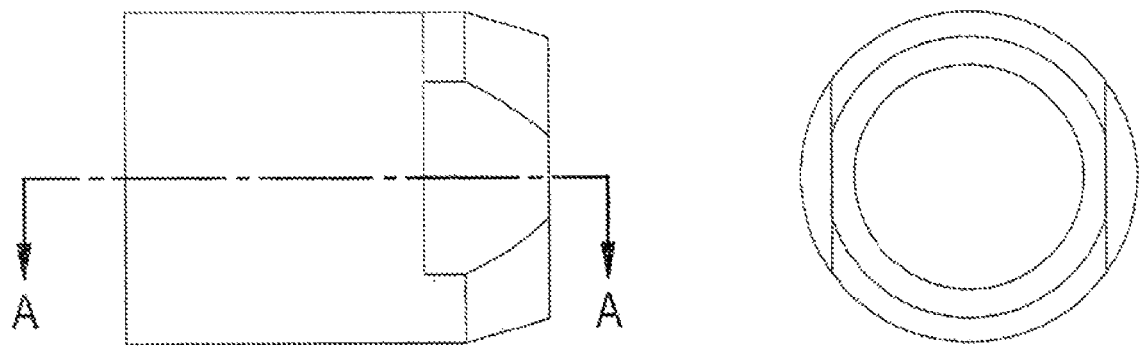
FIG. 8 illustrates front, side, and sectional views of the power cable female nut of the exemplary embodiment of the welding gun of the invention.
Figure 8:
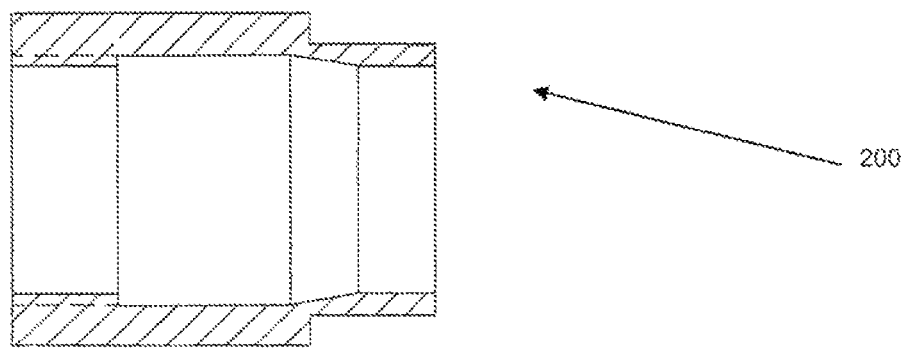
Figure 9:
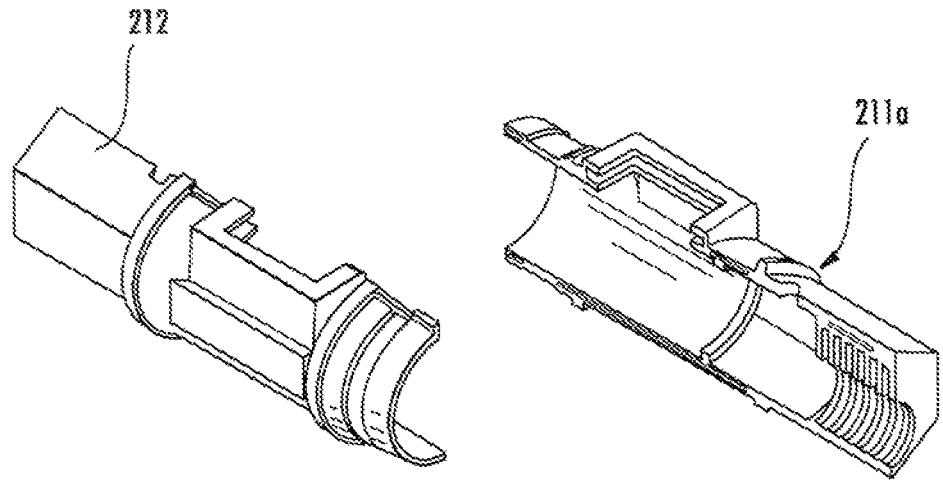
FIG. 9 illustrates an isometric view of a left side handle of the exemplary embodiment of the welding gun of the invention.
Figure 10:
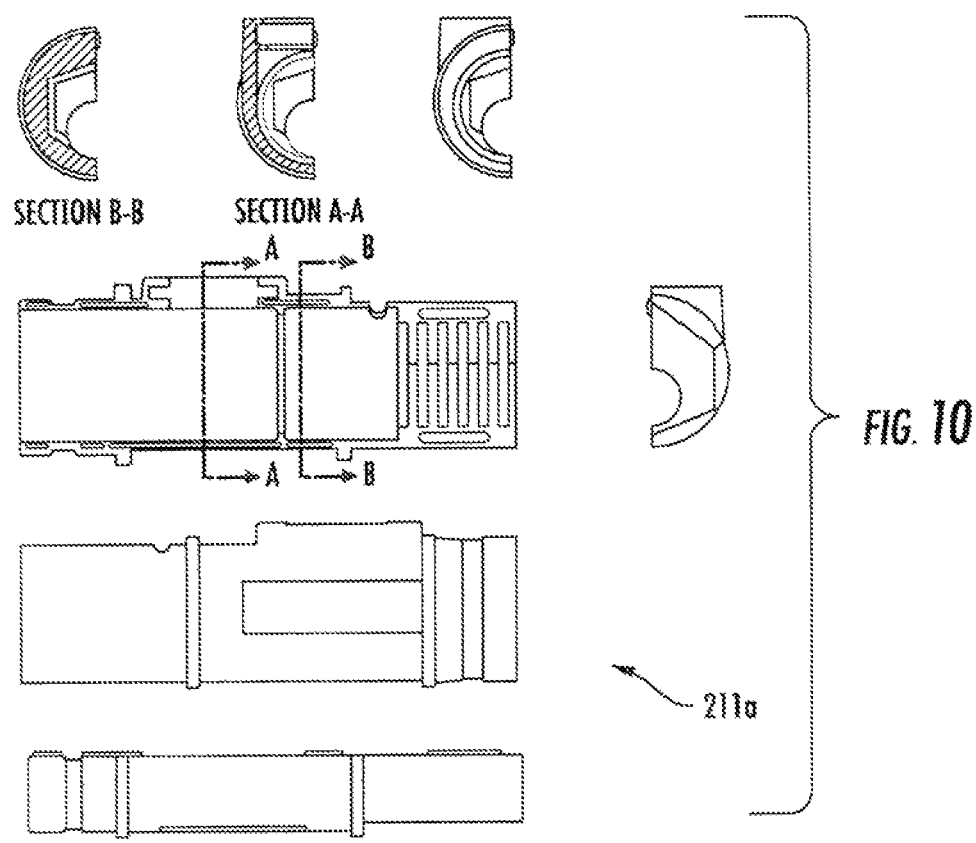
FIG. 10 illustrates front, side, top, bottom, and sectional views of the left side handle of the exemplary embodiment of the welding gun of the invention.
Figure 11:
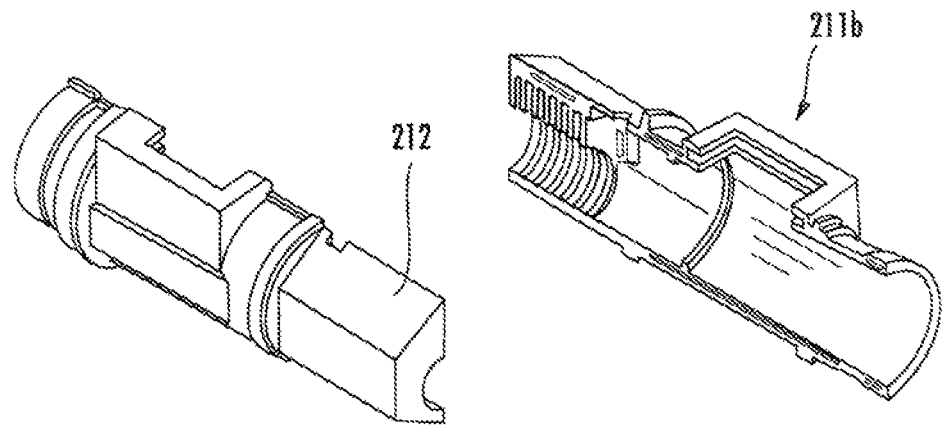
FIG. 11 illustrates an isometric view of a right side handle of the exemplary embodiment of the welding gun of the invention.
Figure 12:
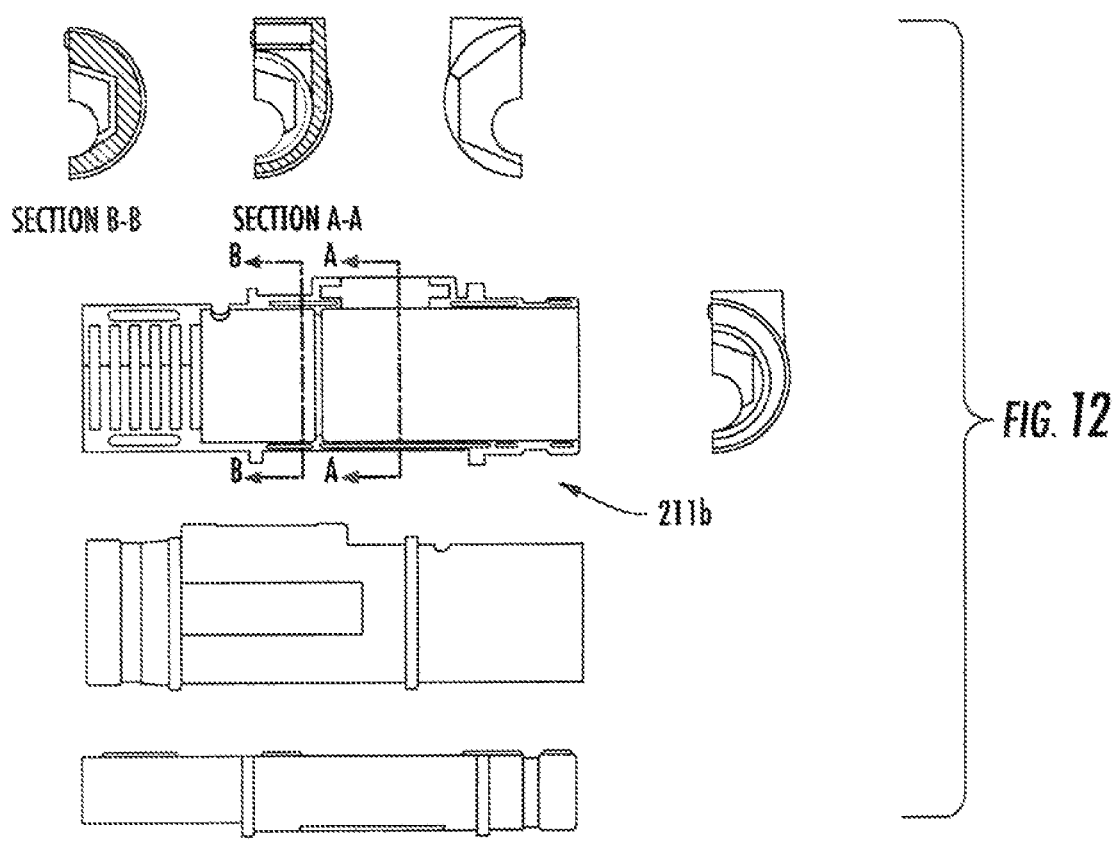
FIG. 12 illustrates front, side, top, bottom, and sectional views of the right side handle of the exemplary embodiment of the welding gun of the invention.
Figure 13:
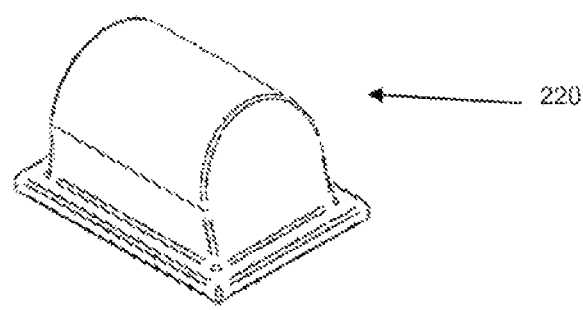
FIG. 13 illustrates an isometric view of a handle cap of the exemplary embodiment of the welding gun of the invention.
Figure 14:
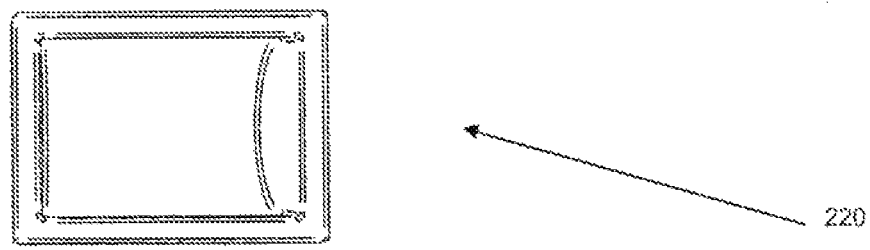
FIG. 14 illustrates top, side, and sectional views of the handle cap of the exemplary embodiment of the welding gun of the invention.
Figure 14:
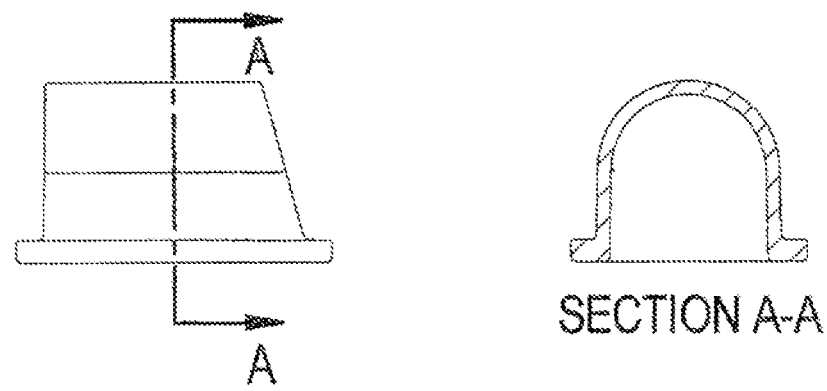
Figure 15:
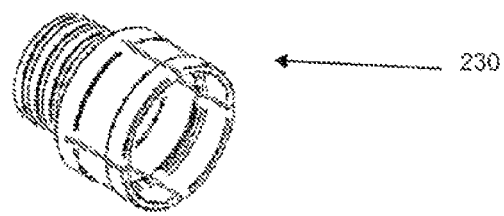
FIG. 15 illustrates an isometric view of a handle end cap of the exemplary embodiment of the welding gun of the invention.
Figure 16:
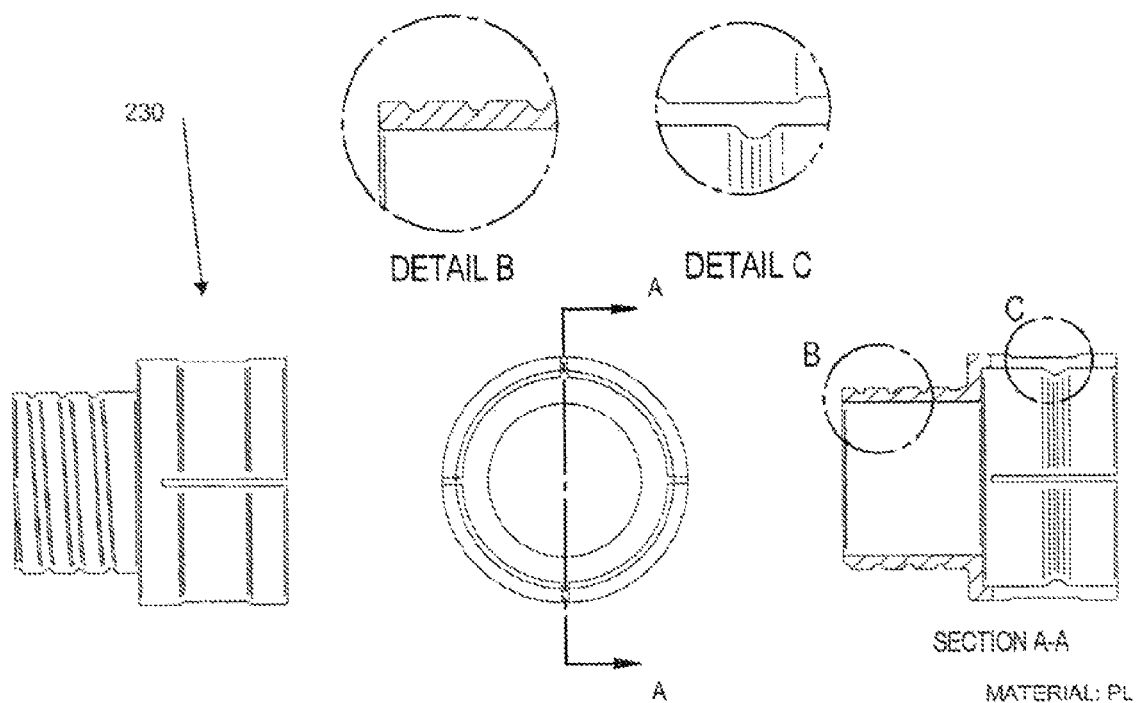
FIG. 16 illustrates front, top, and sectional views of the handle end cap of the exemplary embodiment of the welding gun of the invention.

Handle clamp 170 provides a central structure for the welding gun. Handle clamp 170 is shown in more detail in FIGS. 2 and 3. Successively extending rearward from handle clamp 170 are cable connector block 174 (FIG. 4), power cable male cone 190 (FIGS. 5 and 6), power cable female nut 200 (FIGS. 7 and 8), and conduit 240. These features together provide a continuous path for welding wire and shielding gas to be supplied from the power source to the welding gun.

Cable connector block 174, power cable male cone 190, and power cable female nut 200 are each enclosed within handle 210 (made up of handle halves 211a and 211b), handle cap 220, and handle end cap 230 (FIGS. 9-16). Handle cap 220 is provided for instances when the welding gun needs to communicate with the welding control. Handle end cap 230 is arranged over the two handle halves (211a and 211b) to hold the handle halves together.

The distal end 212 of handle 210 is restrained axially within handle clamp 170 by clamping action provided by fasteners 172. In this exemplary embodiment, distal end 212 of handle 210 is formed in a hexagonal shape, which matches the hexagonal receiving surface 171 in handle clamp 170. These matching shapes facilitate the clamping connection between handle clamp 170 and handle 210, and also prevent the relative rotation of these features. Other shapes that provide these functions may also be used.

Alternatively, the features extending rearward from handle clamp 170 may be arranged in any configuration that provides the functionality described above.

Cable connector block 174a, power cable male cone 190a, power cable female nut 200a, conduit 240a, handle 210a, handle cap 220a and handle end cap 230a are similarly arranged.

Successively extending forward from handle clamp 170 are gooseneck 160, diffuser 150, tip holder 140, diffuser cap 130, contact tip assembly 120, and nozzle 110. These features together provide a continuous path for welding wire and shielding gas to be supplied from the cable connector block 174 to contact tip assembly 120.

Figure 17:
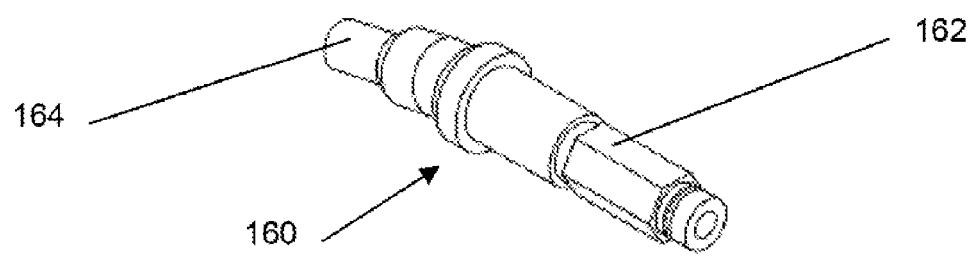
FIG. 17 illustrates an isometric view of a gooseneck assembly of the exemplary embodiment of the welding gun of the invention.
Figure 18:
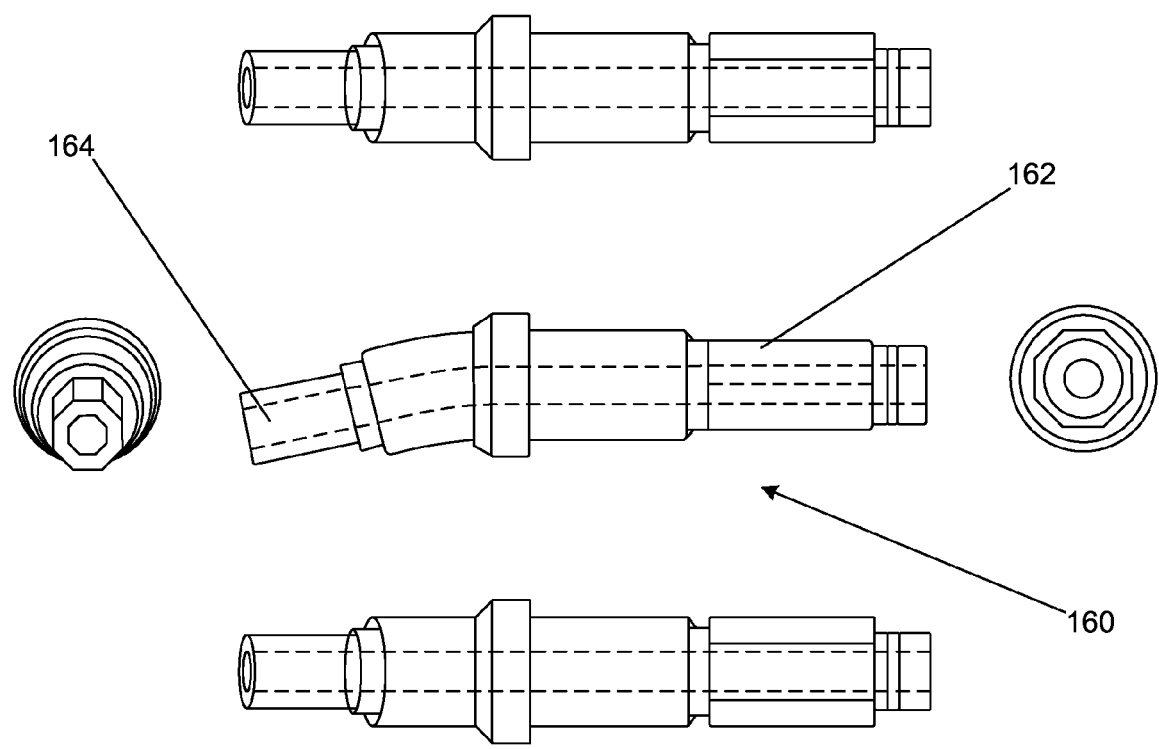
FIG. 18 illustrates front, rear, side, top and bottom views of the gooseneck of the exemplary embodiment of the welding gun of the invention.

Gooseneck 160 (FIGS. 17 and 18) is a conduit for welding wire and shielding gas to be transported to diffuser 150. The rear end 162 of gooseneck 160 is inserted into receiving surface 176 of cable connector block 174 through opening 212 in handle 210. In this exemplary embodiment, the rear end 162 is formed of a hexagonal shape, which matches the hexagonal shape of receiving surface 176 in cable connector block 174. These matching shapes facilitate the connection between gooseneck 160 and cable connector block 174, facilitate the electrical contact therebetween, and prevent the relative rotation of these features. Other shapes which provide this functionality may also be used. Small fasteners 179 may also be threaded into handle clamp 170 and/or cable connector block 174 to axially restrain gooseneck 160.

Figure 19:
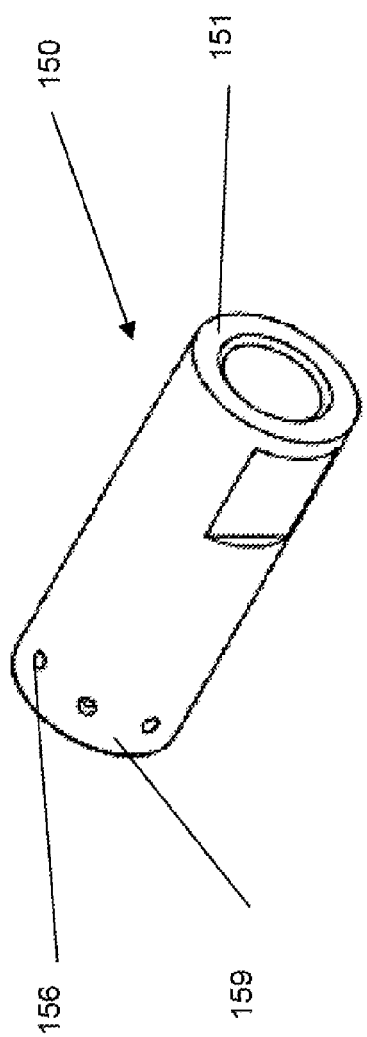
FIG. 19 illustrates an isometric view of a diffuser of the exemplary embodiment of the welding gun of the invention.
Figure 20:
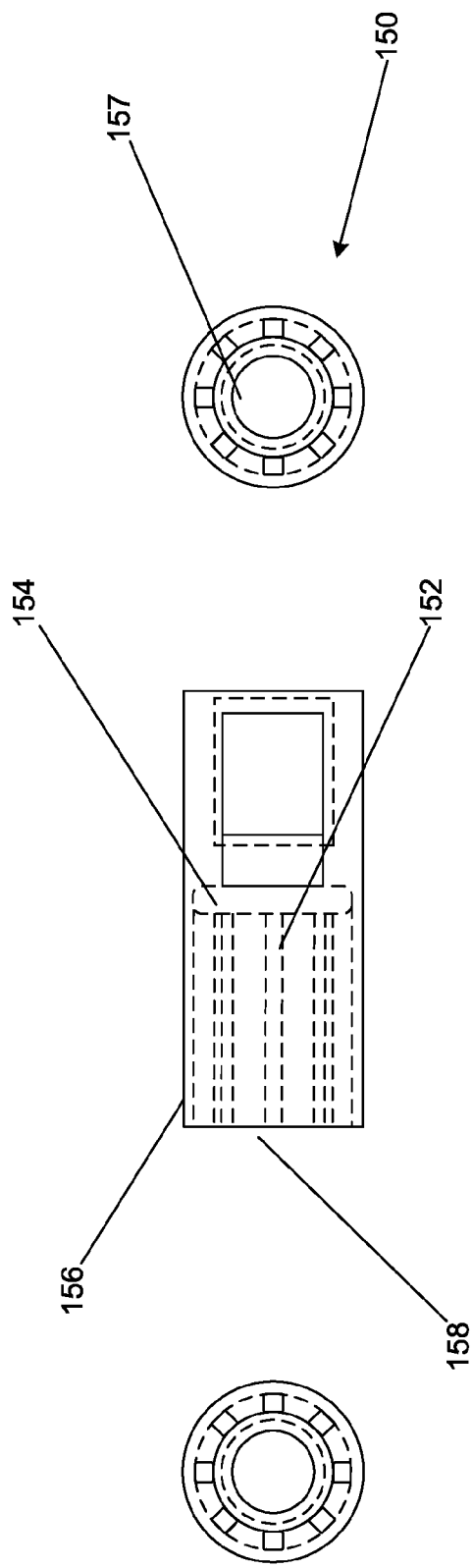
FIG. 20 illustrates front, rear, and side views of the diffuser of the exemplary embodiment of the welding gun of the invention.

Diffuser 150 (FIGS. 19 and 20) is arranged on distal end 164 of gooseneck 160. In this exemplary embodiment, diffuser 150 is threaded on distal end 164. Diffuser 150 includes axial tubes 152 within its casing 151. These axial tubes travel from a groove 154 formed in the casing 151 to the distal end 158 of diffuser 150. In this embodiment, groove 154 is formed distally adjacent to the distal end 164 of gooseneck 160 when diffuser 150 is arranged thereon. Near the distal end 158 of diffuser 150 are also provided radial holes 156 that connect axial tubes 152 with the outer surface 159 of diffuser 150.

Axial tubes 152 are provided to transport shielding gas collected by groove 154 axially within the casing 151 of diffuser 150 before redirecting it out of diffuser 150 through radial holes 156. This axial transport of shielding gas helps to cool the diffuser 150—along with tip holder 140, diffuser cap 130, and contact tip assembly 120—though the principle of heat transfer due to the relative coolness and movement of the shielding gas. This provides cooling effects to diffuser 150, tip holder 140, diffuser cap 130, and contact tip assembly 120, which prolongs their useful lives.

While groove 154 is provided in this embodiment, any groove or baffle feature that redirects shielding gas into axial tubes 152 may be utilized.

Figure 21:
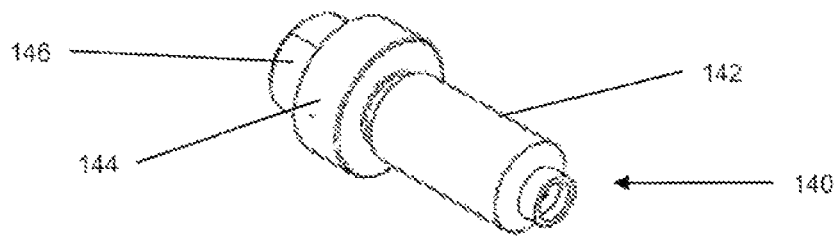
FIG. 21 illustrates an isometric view of a tip holder of the exemplary embodiment of the welding gun of the invention.
Figure 22:
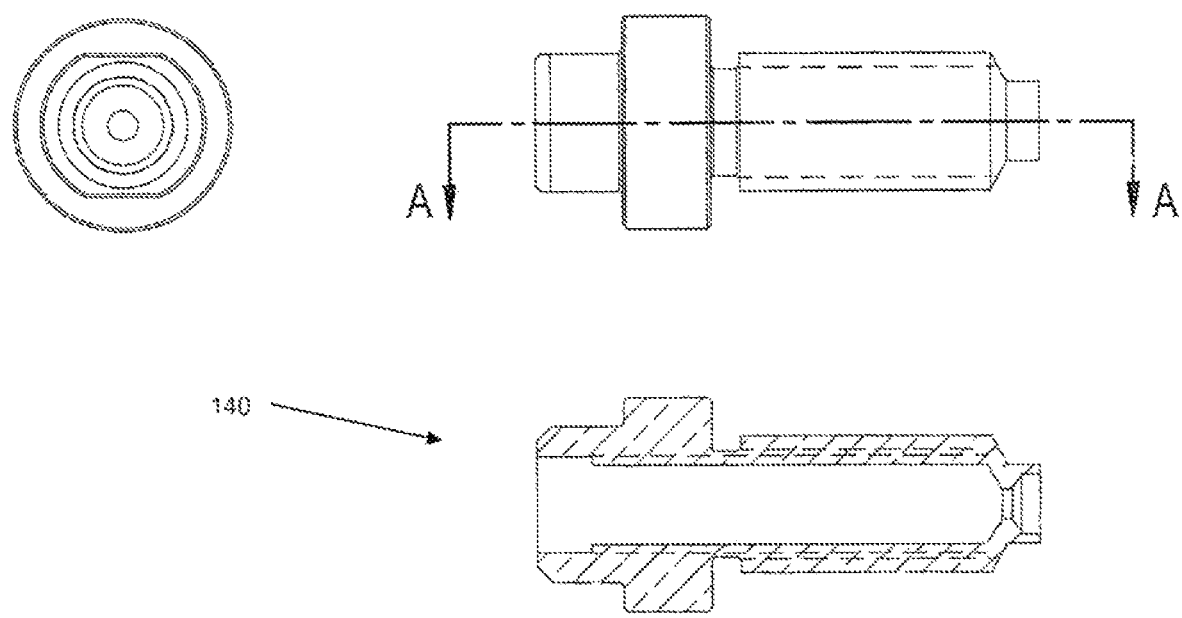
FIG. 22 illustrates front, top, and sectional views of the tip holder of the exemplary embodiment of the welding gun of the invention.

Tip holder 140 (FIGS. 21 and 22) is arranged at the distal end 158 of diffuser 150. Tip holder 140 includes collar 144 which closes the distal ends of the axial tubes 152 of diffuser 150, and proximal end 143, which deflects shielding gas into groove 154 of diffuser 150. In this exemplary embodiment, tip holder 140 includes a long threaded rear portion 142 that is threaded into receiving threads 157 of diffuser 150. Tip holder 140 acts as an interface between diffuser 150 and contact tip assembly 120. Due to the presence of tip holder 140 between diffuser 150 and contact tip assembly 120, the chances of contact tip assembly 120 becoming fused to diffuser 150 due to high heat conditions is eliminated. Additionally, the long threaded rear portion 142 greatly facilitates heat transfer between the contact tip assembly 120, diffuser cap 130, tip holder 140, and diffuser 150, and the release of that heat through the shielding gas flow.

Figure 23:
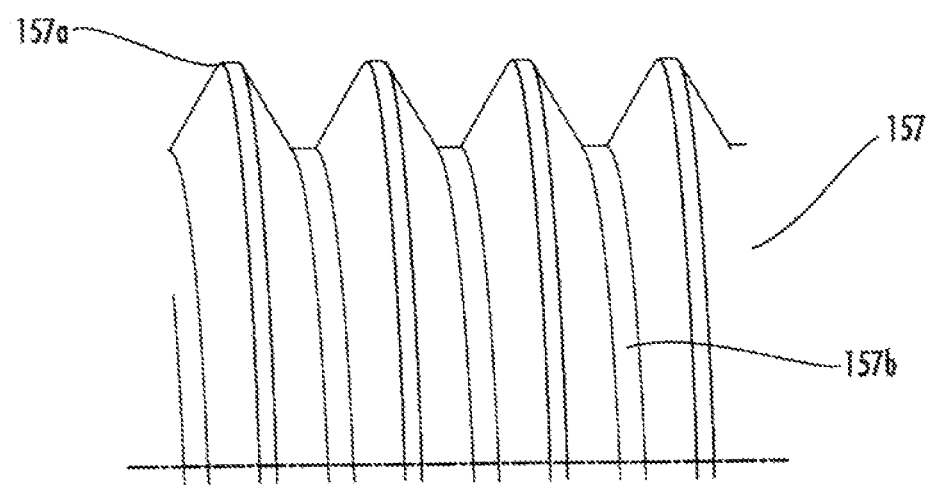
FIG. 23 illustrates the inventive thread shape of the exemplary embodiment of the welding gun of the invention.

Additionally, the threads on long threaded rear portion 142, and/or receiving threads 157, may also utilize a special thread design to provide even more improved heat transfer. This design is shown in more detail in FIG. 23. Specifically, this special thread design incorporates threads that have their peaks 157a, or high points, removed or flattened (such as by machining). The valleys 157b may also be flattened to correspond to opposing peaks. In traditional designs, thread peaks are subject to heat up first, and thus can become fused to mating parts in high heat conditions. The removal of these peaks prevents this fusing. While flattened peaks are shown in this example, other shapes that reduce the high points of the threads may also be used.

Figure 24:
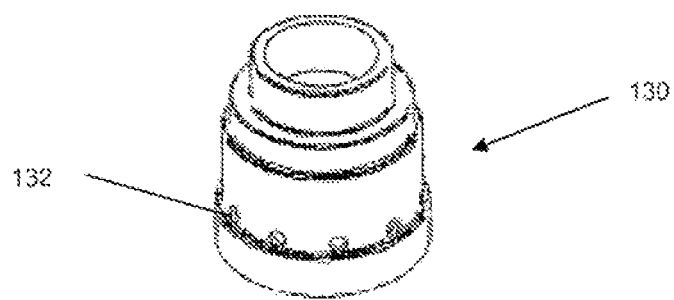
FIG. 24 illustrates an isometric view of a diffuser cap of the exemplary embodiment of the welding gun of the invention.
Figure 25:
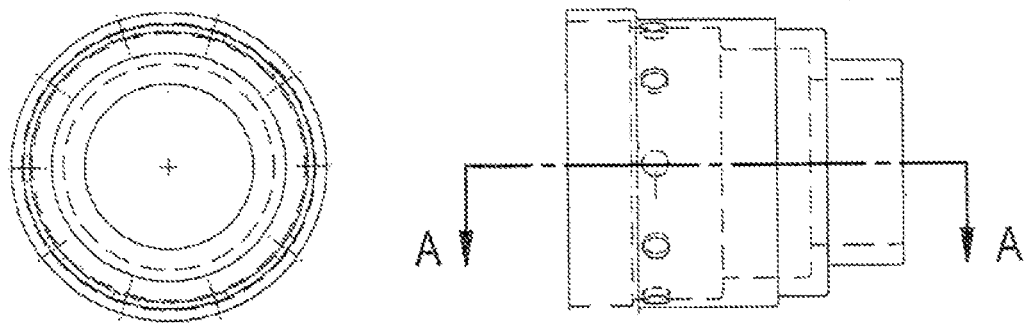
FIG. 25 illustrates front, top, and sectional views of the diffuser cap of the exemplary embodiment of the welding gun of the invention.
Figure 25:
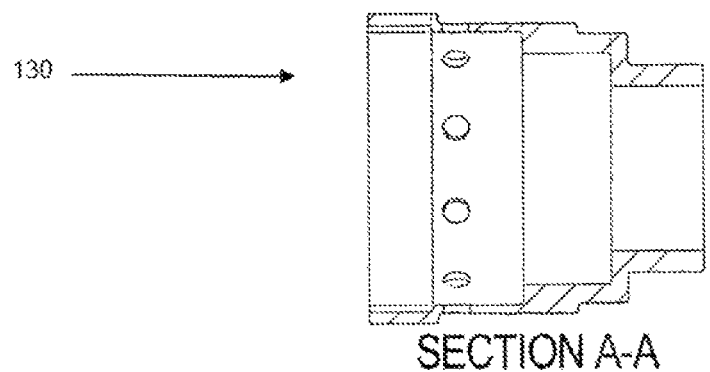

Diffuser cap 130 (FIGS. 24 and 25) is provided at the distal end of tip holder 140, and extends over collar 144 of tip holder 140, and the distal end surface 159 of diffuser 150. Radial holes 132 are provided at the proximal end of diffuser cap 130, and are arranged above radial holes 156 of diffuser 150. Diffuser cap 120 may be retained simply by being sandwiched between tip holder 140 and contact tip assembly 120, or may have its own attachment scheme. Although it is not necessary for radial holes 132 and 156 to align, they may be designed to do so, and diffuser cap 120 may also have an anti-rotation feature which maintains such an alignment. Diffuser cap 120 is a sacrificial part that protects diffuser 150 from spatter.

Figure 26:
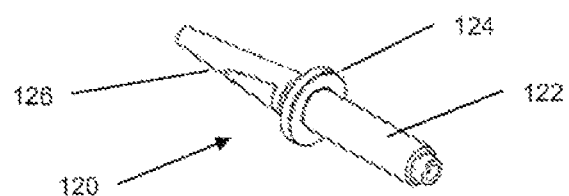
FIG. 26 illustrates an isometric view of a contact tip assembly of the exemplary embodiment of the welding gun of the invention.
Figure 27:
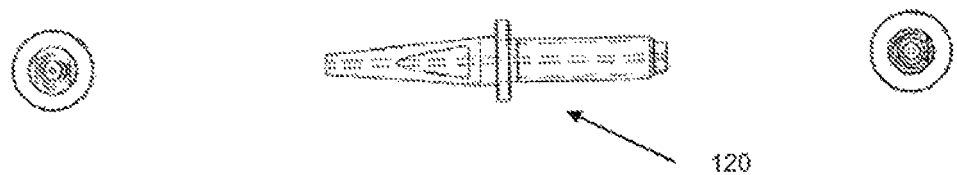
FIG. 27 illustrates front, rear and top views of the contact tip assembly of the exemplary embodiment of the welding gun of the invention.

Contact tip assembly 120 (FIGS. 26 and 27) is provided at the distal end of tip holder 140 and diffuser cap 130. In this embodiment, contact tip assembly 120 has a long threaded portion 122 that threads into tip receiving threads 148 of tip holder 140. Long threaded portion 122 is of sufficient length to extend far into both the tip holder 140 and diffuser 150, thereby facilitating heat transfer from contact tip assembly through tip holder 140 and diffuser 150 to the shielding gas flowing through axial tubes 152 and out through the diffusing shielding gas. The long threaded portion 122 may extend by any length into the tip holder 140, and may have a length coextensive therewith.

The threads on the long threaded portion 122 of contact tip 120, and/or the receiving threads 148 of tip holder 141, may also utilize the special thread feature discussed above (i.e., the threads may have their peaks removed).

Figure 28:
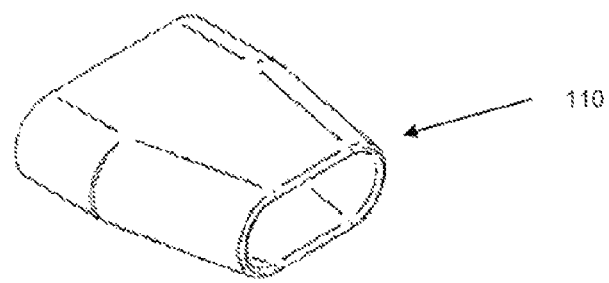
FIG. 28 illustrates an isometric view of a nozzle of the exemplary embodiment of the welding gun of the invention.
Figure 29:
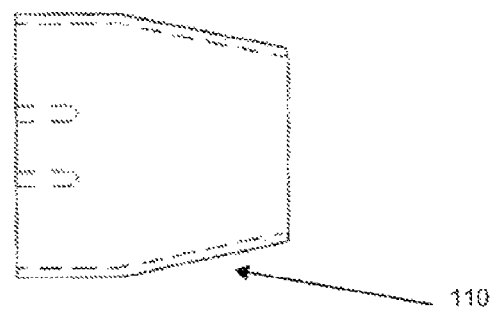
FIG. 29 illustrates front, rear, side, and top views of the nozzle of the exemplary embodiment of the welding gun of the invention.
Figure 29:
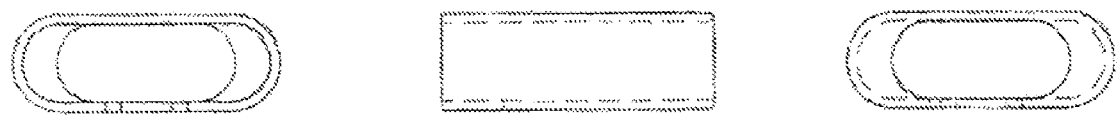
Figure 30:
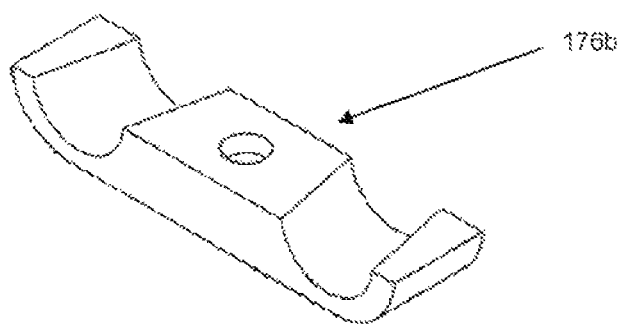
FIG. 30 illustrates an isometric view of an upper gooseneck clamp of the exemplary embodiment of the welding gun of the invention.
Figure 31:
FIG. 31 illustrates front, side, and top views of the upper gooseneck clamp of the exemplary embodiment of the welding gun of the invention.
Figure 31:
Figure 31:
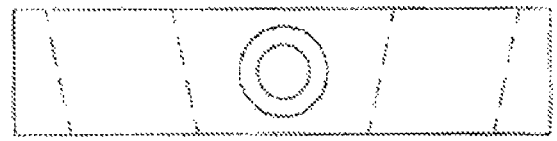
Figure 32:
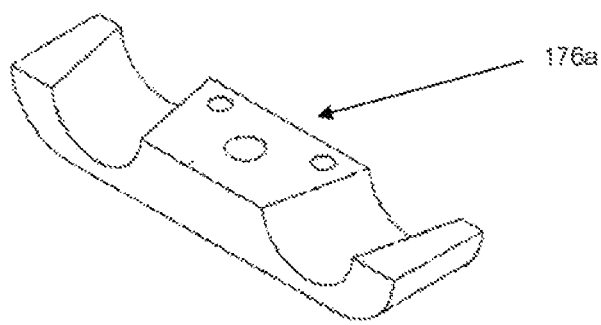
FIG. 32 illustrates an isometric view of a lower gooseneck clamp of the exemplary embodiment of the welding gun of the invention.
Figure 33:
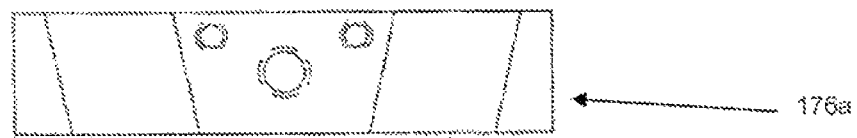
FIG. 33 illustrates front, side, and top views of the lower gooseneck clamp of the exemplary embodiment of the welding gun of the invention.
Figure 33:

Nozzle 110 (FIGS. 28 and 29) surrounds gooseneck 160, diffuser 150, tip holder 140, diffuser cap 130, contact tip assembly 120, and directs the shielding gas diffused from radial holes 156 of diffuser 150 about contact tip 120 to form a protective layer between the molten metal of the welding operation and the surrounding atmosphere.

Gooseneck 160a, diffuser 150a, tip holder 140a, diffuser cap 130a, contact tip assembly 120a, and nozzle 110a are similarly arranged.

Gooseneck clamp 176 (FIGS. 30-33) supports and aligns goosenecks 160 and 160a to each other, and is made of an upper gooseneck clamp 176a and a lower gooseneck clamp 176b, which are mated together via fasteners.

Rod 180 provides a positive adjustable stop to ensure the nozzle is adjusted to the proper axial location.

Figure 34:
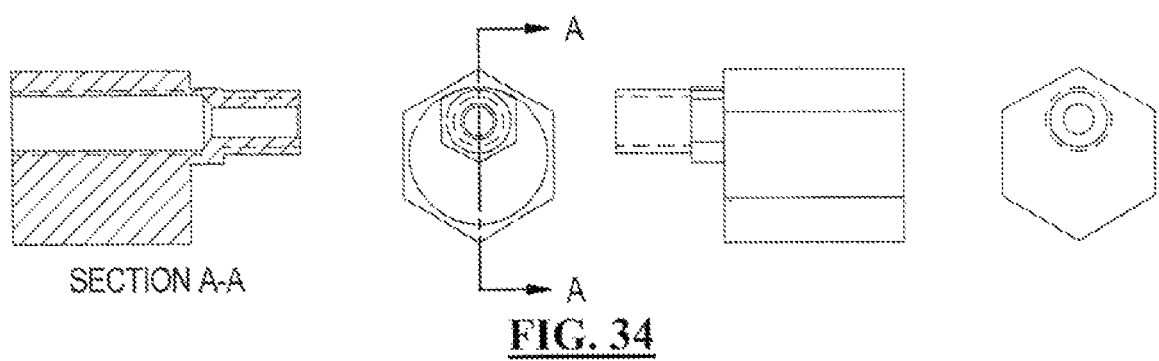
FIG. 34 illustrates front, side, rear and sectional views of a rear cable connector block of the exemplary embodiment of the welding gun of the invention.

The welding gun 100 may be connected to a welding power source by a rear cable connector and gun connector, such as shown in FIGS. 34-36.

The welding gun described in the above exemplary embodiment can be employed for hand-held welding, robotic welding and hard automation.

The welding gun described in the above exemplary embodiment employs air cooling. But, the invention is equally applicable to water cooled systems, as a water cooling means may be added to the disclosed welding gun and used in conjunction with the heat transfer characteristics provided by the axial tubes 152 in diffuser 150. Such a configuration would provide even further improved cooling for the welding gun.

The welding gun described in the above exemplary embodiment employs fasteners is some instances. These fasteners can be any of screws, bolts, clamps, snap-fasteners, lock-fits, or any other type of fastener that provides similar functionality.

The welding gun described in the above exemplary embodiment employs threaded fastening between components. However, alternative methods of fastening might also be used, such as slotting, clamping, snap-fitting, or any other method that provides similar functionality.

The welding gun described in the above exemplary embodiment employs anti-rotation features between components, such as the illustrated hexagonal shapes. But, any shape that prevents rotation may be used, such as a triangle, square, pentagon, etc. Alternatively, any other anti-rotation features, such as fins and slots, may be used.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A shielding gas diffuser, comprising:
   a casing; and
   an axial tube extending within the casing,
   wherein the casing further comprises a distal end and a radial hole formed in an outer surface of the casing near the distal end, and
   wherein the radial hole is connected to the axial tube.

2. The shielding gas diffuser recited in claim 1, further comprising:
a groove formed in a radially inner surface of the casing, and connected to a proximal end of the axial tube.

3. The shielding gas diffuser recited in claim 1, wherein a distal end of the axial tube opens to the distal end of the casing.

4. The shielding gas diffuser recited in claim 1, further comprising:
a connection system for a tip holder on a radially inner surface of the casing.

5. The shielding gas diffuser recited in claim 4, wherein the connection system comprises threads with reduced peaks.

6. The shielding gas diffuser recited in claim 4, wherein the connection system is axially coextensive with the axial tube.

7. A shielding gas diffuser, comprising:
a casing; and
axial tubes extending within the casing,
wherein the casing further comprises a distal end and radial holes formed in an outer surface of the casing near the distal end, and
wherein the radial holes are individually connected to the axial tubes.

8. The shielding gas diffuser recited in claim 7, further comprising:
a groove formed in a radially inner surface of the casing and connected to proximal ends of the axial tubes.

9. The shielding gas diffuser recited in claim 7, wherein distal ends of the axial tubes open to the distal end of the casing.

10. The shielding gas diffuser recited in claim 7, further comprising:
a connection system for a tip holder on a radially inner surface of the casing.

11. The shielding gas diffuser recited in claim 10, wherein the connection system comprises threads with reduced peaks.

12. The shielding gas diffuser recited in claim 10, wherein the connection system is axially coextensive with the axial tubes.

13. A shielding gas diffuser, comprising:
a casing; and
a connection system for a tip holder on a radially inner surface of the casing,
wherein the connection system comprises threads with reduced peaks.

14. The shielding gas diffuser recited in claim 13, wherein the casing further comprises an axial tube therein to axially transport shielding gas, and
wherein the connection system is axially coextensive with the axial tube.

15. The shielding gas diffuser recited in claim 13, wherein the casing further comprises axial tubes therein to axially transport shielding gas, and
wherein the connection system is axially coextensive with the axial tubes.

16. A shielding gas diffuser, comprising:
a casing;
a means for transporting shielding gas axially within the casing; and
a means for expelling shielding gas in a radial direction out of the shielding gas diffuser near a distal end of the shielding gas diffuser,
wherein the means for expelling and the means for transporting are connected.

17. The shielding gas diffuser recited in claim 16, further comprising:
a means for redirecting shielding gas from inside the shielding gas diffuser into the means for transporting,
wherein the means for redirecting and a proximal end of the means for transporting are connected.

18. The shielding gas diffuser recited in claim 16, further comprising:
a means for connecting a tip holder on a radially inner surface of the casing.

19. The shielding gas diffuser recited in claim 18, wherein the means for connecting comprises threads with reduced peaks.

20. The shielding gas diffuser recited in claim 18, wherein the means for connecting is axially coextensive with the means for transporting.

21. A shielding gas diffuser, comprising:
a casing; and
a means for connecting a tip holder on a radially inner surface of the casing,
wherein the means for connecting comprises threads with reduced peaks.

22. The shielding gas diffuser recited in claim 21, wherein the casing further comprises a means for transporting shielding gas axially within the casing, and
wherein the means for connecting is axially coextensive with the means for transporting.

23. A welding gun comprising:
a handle assembly including a first conduit to provide a first continuous path for welding wire and shield gas from a source to the welding gun;
a central handle clamp having a receiving surface for connection with the handle assembly;
a second conduit extending forward from the central handle clamp;
a diffuser engaged with the second conduit, the diffuser having an outer surface an inner surface defining a central passage for the shielding gas, the diffuser further including a plurality of tubes radially disposed about the central passage and extending between the outer and inner surfaces for transporting a shielding gas from the central passage;
a contact tip assembly disposed within the central passage of the diffuser so as to transfer heat from the contact tip assembly to the shielding gas in the central passageway;
a tip holder to provide an interface between the diffuser and the contact tip assembly, the tip holder including a collar engaged with the distal end of the diffuser so as to close a distal
end of each of the plurality of tubes such that shielding gas in the axial tubes is redirected out of the diffuser; and
a nozzle surrounding the contact tip assembly.

24. The welding gun of claim 23, wherein the contact tip assembly comprises two contact tips.

25. The welding gun of claim 23, wherein the inner surface of the diffuser includes a redirecting surface to direct shielding gas into the plurality of tubes.

26. The welding gun of claim 25, wherein the redirecting surface is one of a groove and a baffle.

27. The welding gun of claim 23, wherein the plurality of tubes each include a portion that extends axially and a portion that extends radially.

28. The welding gun of claim 23, wherein the diffuser and the tip holder have a threaded engagement, and
wherein further at least one of the diffuser and the tip holder includes threads with flattened peaks.

29. The welding gun of claim 23, further comprising:
a diffuser cap at and end of the tip holder for covering at least a portion of the outer surface of the diffuser.

30. The welding gun of claim 23, wherein the nozzle surrounds the diffuser so as to direct shielding gas from the plurality of tubes about the contact tip assembly to form a protective layer between a molten metal of a welding operation and a surrounding atmosphere.

31. A welding gun comprising:
  a shielding gas diffuser, the shielding gas diffuser comprising,
  a casing having an outer surface and an inner surface disposed about a central axis,
  at least one axial tube extending axially within the casing, the inner surface including a directing feature to direct shielding gas within the casing into the at least one axial tube, and
  at least one radial hole formed in the outer surface of the casing, each of the at least one radial hole respectively extending to the at least one axial tube to transport the shielding gas out of the gas diffuser.

32. A shielding gas diffuser, the shielding gas diffuser comprising:
  a casing having an outer surface and an inner surface disposed about a central axis;
  at least one axial tube extending axially within the casing, the inner surface including a directing feature to direct shielding gas within the casing into the at least one axial tube; and
  at least one radial hole formed in the outer surface of the casing, each of the at least one radial hole respectively extending to the at least one axial tube to transport the shielding gas out of the gas diffuser.

33. A welding gun comprising:
  a shielding gas diffuser, the shielding gas diffuser comprising,
  a casing having an outer surface and an inner surface disposed about a central axis,
  at least one axial tube extending axially within the casing, the inner surface including a groove to direct shielding gas within the casing into the at least one axial tube, the groove connected to a proximal end of the at least one axial tube, and
  at least one radial hole formed in the outer surface of the casing, each of the at least one radial hole respectively extending to the at least one axial tube to transport the shielding gas out of the gas diffuser.

34. A shielding gas diffuser, the shielding gas diffuser comprising:
  a casing having an outer surface and an inner surface disposed about a central axis;
  at least one axial tube extending axially within the casing, the inner surface including a groove to direct shielding gas within the casing into the at least one axial tube, the groove connected to a proximal end of the at least one axial tube; and
  at least one radial hole formed in the outer surface of the casing, each of the at least one radial hole respectively extending to the at least one axial tube to transport the shielding gas out of the gas diffuser.

35. The welding gun recited in claim 33, further comprising:
  a connection system for a tip holder on the inner surface of the casing,
  wherein the connection system comprises threads with reduced peaks.

36. The shielding gas diffuser recited in claim 34, further comprising:
  a connection system for a tip holder on the inner surface of the casing,
  wherein the connection system comprises threads with reduced peaks.

* * * * *